(12) United States Patent
Wright et al.

(10) Patent No.: US 9,592,815 B2
(45) Date of Patent: Mar. 14, 2017

(54) TRAIN BRAKE SAFETY MONITORING AND FAULT ACTION SYSTEM

(71) Applicant: NEW YORK AIR BRAKE, LLC, Watertown, NY (US)

(72) Inventors: Eric C. Wright, Evans Mills, NY (US); Jason Connell, Bethel Park, PA (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 0 days.

(21) Appl. No.: 14/699,514

(22) Filed: Apr. 29, 2015

(65) Prior Publication Data
US 2016/0318497 A1 Nov. 3, 2016

(51) Int. Cl.
*B60T 17/22* (2006.01)
*B60T 13/66* (2006.01)

(52) U.S. Cl.
CPC .......... *B60T 17/228* (2013.01); *B60T 13/665* (2013.01)

(58) Field of Classification Search
None
See application file for complete search history.

(56) References Cited

U.S. PATENT DOCUMENTS

| 5,744,707 A | 4/1998 | Kull | |
| 2011/0077815 A1* | 3/2011 | Walter | B61K 9/00 701/31.4 |
| 2014/0343767 A1 | 11/2014 | Oswald | |

FOREIGN PATENT DOCUMENTS

EP 1162120 12/2001

OTHER PUBLICATIONS

International Search Report Form PCT/ISA/220, International Application No. PCT/US2015/028230, pp. 1-9, dated Dec. 21, 2015.

* cited by examiner

*Primary Examiner* — Mussa A Shaawat
*Assistant Examiner* — Kyung Kim
(74) *Attorney, Agent, or Firm* — David L. Nocilly; Bond, Schoeneck & King, PLLC

(57) ABSTRACT

An on-board train brake safety monitoring and fault action system that compares actual train brake power with expected train brake power to provide real time reporting to the train driver of the margin between the actual brake power and a safe threshold. The system may be configured to automatically make a full service brake penalty if the actual brake system power is less than a safe brake power threshold, such as those required by government regulations, or to adjust the braking system to improve actual brake efficiency. The on-board train brake monitoring system may optionally receive data from wayside hot and cold wheel detector systems to augment the actual brake power measurements.

14 Claims, 3 Drawing Sheets

TRAIN BRAKE SAFETY MONITORING AND FAULT ACTION SYSTEM

BACKGROUND OF THE INVENTION

1. Field of the Invention

The present invention relates to train braking systems and, more particularly, to a system for monitoring and addressing the actual power of a train braking system.

2. Description of the Related Art

The braking power of a train is typically the subject of strict government requirements that are designed to ensure the safe operation of trains. In the United States, the Federal Railroad Administration (FRA) has issued complex and burdensome rules governing train braking. For example, the FRA rules require that one hundred percent of the brakes on a train shall be effective and operative brakes prior to use or departure from certain locations. Furthermore, the train shall not move if less than 85 percent of the cars in a train have effective and operative brakes. The failure of the actual braking power of the train to exceed certain thresholds requires the train to be taken out of the service. The FRA rules also require that a train must be stopped at a qualified location every 1000 miles, more or less, depending on numerous factors, including if cars are added or removed from the train. The terminal test is burdensome as it requires the train to be sided at an approved rail yard for the test and inspection and those rail yards are often congested with other trains to be tested, trains being made up, and cars being transferred from one train to another. In addition, the terminal test is lengthy and can only be done by certain qualified personnel. While advances in the art, such as electronically controlled pneumatic (ECP) brakes have resulted in more relaxed rule in light of the ability of ECP systems to provide some feedback on brake system and even stop a train whose brake function has declined, these systems do not determine the actual effectiveness of the braking system. Accordingly, there is a need in the art for a system that can accurately determine the actual power of the braking system of the train to ensure that the train is being operated within safe margins without the need for burdensome testing.

BRIEF SUMMARY OF THE INVENTION

The present invention comprises a train brake safety system for improving train braking safety that includes an actual brake power module programmed to calculate the actual brake power exhibited by a train during operation of the train and a brake efficiency module programmed to determine whether the actual brake power exhibited by the train has fallen below a safe brake power threshold. An expected brake power module may be used to calculate the theoretical brake power of the train. The invention further comprises a response module that initiates one or more actions in response to the actual brake power falling below the safe brake power threshold. Responsive actions may include stopping the train or sending a command to the brake control system to cause a predetermined or proportional increase in the brake pipe set pressure in response to the actual brake power falling below the safe brake power threshold. The safe brake threshold can comprise a percentage of the theoretical expected brake power for the train or the maximum actual brake power of the train as determined by one or more tests performed with the braking system in 100 percent working condition. The safe brake threshold may adjusted according to at least adjustment factor to account for the particular terrain of the route to be traversed by the train, the geographic nature of the route to be traversed, the type of cargo carried by the train, the weather conditions, the operation of the braking system of the train, or other factors impacting the performance of the braking system.

The present invention includes a method of providing train brake safety where the expected brake power of a train is determined and then compared to the actual brake power of a train as measured during operation of the train. If the actual power of the train is less than the expected brake power of the train by a safe brake threshold, thereby indicating an unsafe amount of available brake power, various responses may be taken. For example, the train may be automatically stopped or the brake pipe set pressure of the brake control system adjusted to compensate for the lack of actual brake power.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
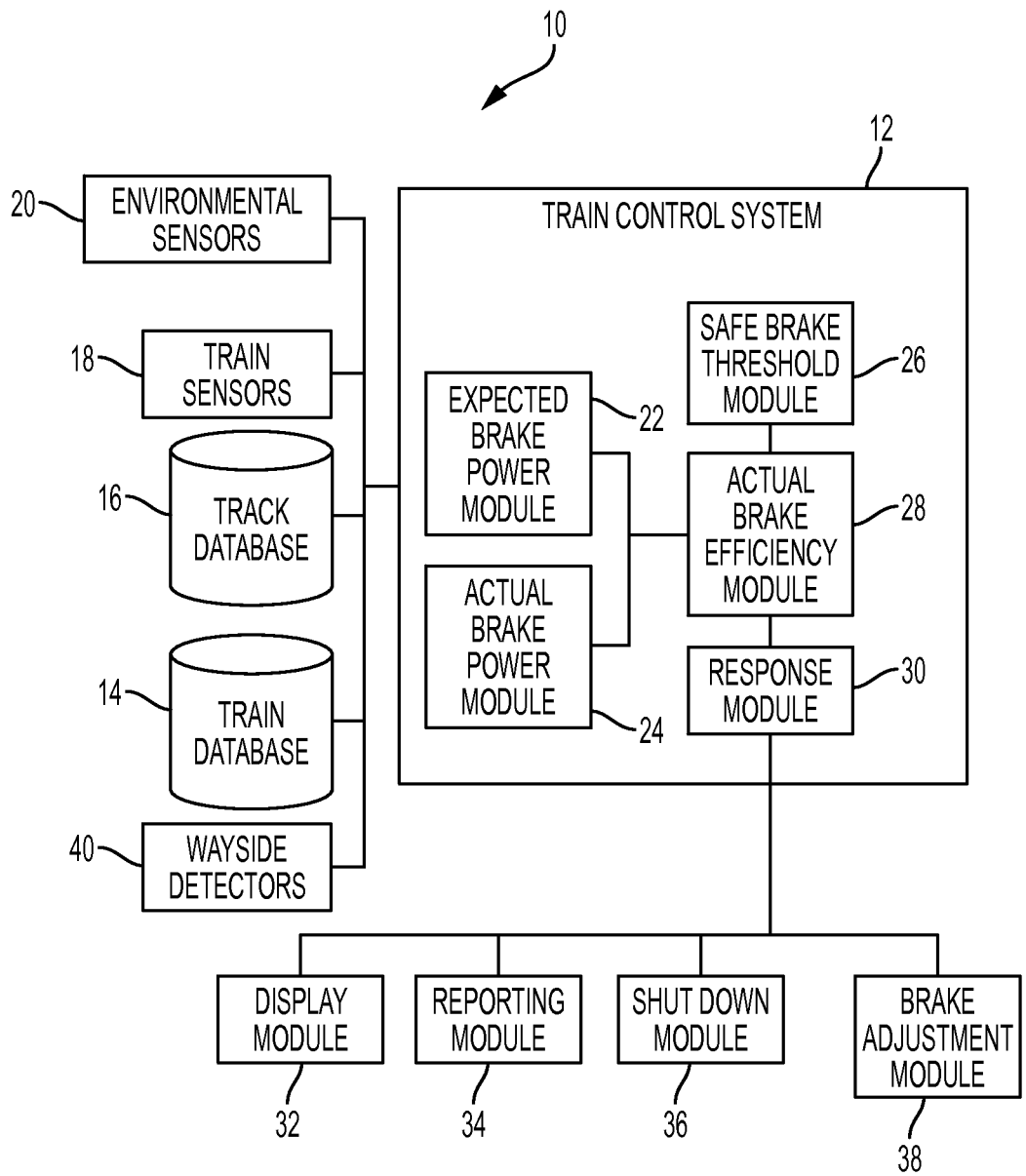
FIG. 1 is a schematic of a train brake safety monitoring and fault action system according to the present invention.

Referring now to the drawings, wherein like reference numerals refer to like parts throughout, there is seen in FIG. 1 a schematic of a system 10 for providing real-time train brake safety monitoring. System 10 generally comprises a train control system 12, such as such as the LEADER® system available from New York Air Brake LLC of Watertown New York, that is positioned on-board a locomotive of a train and responsible for managing operations of a train. Train control system 12 is further associated with several sources of data about a particular train and the route along which the train with travel, such as a train database 14 having a train manifest that includes information about the nature of weight of all rail cars in the train and the locomotives in the train consist. Train control system 12 is further associated with a track database 16 having a track profile that contains the geographic routes to be taken by the train as well as the specification information about the route, such as the elevation changes, track curvature, etc. Train control system 12 is also associated with various train sensors 18 that provide train control system 12 with operational information about the train, such as the train speed, brake pipe pressure, brake pipe pressure flow, and brake pipe pressure gradient. Train control system 12 may also be associated with various environmental sensors 20 that provide information about external conditions, such as the temperature, weather conditions, etc.

Train control system 12 is programmed to include an expected brake power module 22 that calculates the expected brake power for a particular train. The expected brake power reflects the total braking force that the train should be providing when all brakes on the train are effective and operating. The expected brake power of the train may be determined in at least two ways.

In one approach, expected brake power module 22 may calculate the expected brake power based on the amount of brake force each car in a train should produce. This determination may be made by calculating the net braking ratio of each freight car in the train. The net braking ratio of a car is determined as follows:

$$NBR = (\text{Total Brake Shoe Force})/(\text{Car Weight})$$

Current AAR car brake design requirements (S401) require that car brakes provide a NBR of no less than 11 percent for loaded cars and no more than 38 percent for empty cars, calculated at 65 psi brake cylinder pressure, which is equivalent to a full service brake application from a 90 psi brake pipe. Previous AAR NBR requirements allowed a minimum NBR of 8.5 percent loaded. Therefore, a train made up of cars meeting both current and previous AAR requirements may have a minimum NBR of 8.5 percent if the all cars are loaded and a maximum NBR of 38 percent if all the cars are empty. The total brake force may be then calculated as the product of the overall net braking ratio of the cars in the train, the weight of the train, and the coefficient of friction (g) between the brake shoes and wheels of the cars in the train as follows:

$$\text{Brake Force} = NBR * W_{train} * \mu$$

The coefficient of friction ($\mu$) between brake shoes and the wheels of a car can vary according to speed and temperature, but are generally available from the manufacturer of the brake shoes or regulatory compliance testing. Because NBR is calculated at a brake cylinder (BC) pressure that represents full service (65 psi BC pressure), the relationship for brake force can be further modified to account for an actual brake application as follows:

$$\text{Brake Force} = NBR * (BC \text{ Pressure}/65 \text{ psi}) * W_t * \mu$$

As some of the brake cylinder pressure is needed to drive the mechanical linkage so that the brake shoe makes contact with the wheel, (typically about 3.5 psi), the calculation for brake force can be even more accurate represented as follows:

$$\text{Brake Force} = NBR * ((BC \text{ Pressure} - 3.5)/(65 - 3.5)) * W * \mu$$

As the brake cylinder pressure is approximately 2.5 times the amount of the brake pipe (BP) pressure reduction that causes a brake application, the brake force may be expressed in terms of the BP pressure reduction as follows:

$$\text{Brake Force} = NBR * (((BP \text{ Reduction} * 2.5) - 3.5)/(65 - 3.5)) * W * \mu$$

Thus, using the information provided to train control system 12, such as the train data in train database 14 and the operational information provided by train sensors 18, it is possible to calculate the expected brake power for a train.

In a second approach, expected brake power module 22 may calculate the expected brake power based upon the measured brake force of the train when braking system is in 100 percent working order. For example, the train may be subjected to one or more brake applications immediately after determining that the brakes are in working order, such as after a terminal test has been performed, so that expected brake power module 22 can calculate the actual braking power of the train. For example, the brake force actually applied by a train during a braking operation may be calculated as follows:

$$\text{Brake Force} = N * W * A_{train}/G - \text{Train Resistance} - \text{Force}_{Grade} - F_{curvature}$$

where N is the number of cars in the train, W is the weight of each car in the, $A_{train}$ is the measured deceleration rate of the train, G is the gravitational constant, Train Resistance is the total rolling resistance of the cars in the train, $\text{Force}_{Grade}$ is the force due to the track gradient, and $F_{curvature}$ is the force due to curvature of the track. More specifically, Train Resistance is calculated based on the resistance of each car in the train as follows:

$$\text{Train Resistance} = \Sigma R(i), \text{ where } I\text{-}1 \text{ to } N \text{ cars}$$

R is calculated as follows:

$$R = 0.6 * W + 20 * n + 0.01 * V * W + K * V^2$$

Where W is the weight of each car, n is the number of axles per car, V is the speed of the cars, and K is the drag coefficient. $\text{Force}_{Grade}$ is calculated as follows:

$$\text{Force}_{grade} = W * \text{percent gradient \%}$$

As each car may be experiencing a different grade, $\text{Force}_{grade}$ could be more accurately calculated by summing the individual grade force for each car based on its individual weight and the percent grade it is experiencing. $\text{Force}_{grade}$ could be a positive or negative number depending on whether the train is traveling uphill or downhill. Finally, $F_{curvature}$ may be calculated as follows:

$$F_{curvature} = K_2/R_c. \text{ Where } K_2 \text{ is } a \text{ constant and } R_c \text{ is the radius of the curve.}$$

As with the other calculations, this could be performed for each car in the train and then summed to more accurately determine the forces over the length of the train.

Train control system 12 is further programmed to include an actual brake power module 24. Using data provided by, among other things, track database 16 and train sensors 18, actual brake power module 24 calculates the actual brake power of a particular train during a brake application. Actual brake power module 24 is programmed to determine the braking power of the train at a particular point in time during its operation for subsequent comparison to the expected brake power determined by brake power module 24.

The actual brake power may be calculated by actual brake power module 24 based on the actual deceleration rate (rate of change of speed) of the train as a result of a particular brake application. For example, the actual brake power may be determined based on the following formula:

$$\text{Brake Force} = N * W * A_{train}/G - \text{Train Resistance} - \text{Force}_{Grade} - F_{curvature}$$

As described above with respect to the use of this formula to determine the actual brake force of a train during a baseline test, the data required by the various calculations may be gleaned from train database 14, track database 16, and sensors 18. As the formula takes into account changes in train resistance and the forces on the train due to grade and track curvature, actual brake power module 24 provides measurement of actual brake power that can be more readily compares to the expected brake power regardless of the particular conditions in which the train is being operated.

Train control system 12 may further be programmed to include a safe brake threshold module 26 that calculates a safe brake threshold that represents the percentage difference between actual brake power during operation and the expected brake power that is acceptable in order to ensure safe for the operation of the train, e.g., the loss of brake power that is regarded as acceptable under applicable rules and regulations or the particular conditions of the route. For example, FRA regulations require that the train shall not move if less than 85 percent of the cars in a train have effective and operative brakes. Thus, the safe brake threshold module 26 may include a default setting of 85 percent that represents the amount of loss of brake power that is acceptable under FRA regulations.

The default safe brake threshold set by safe brake threshold module 26 may be adjusted according to a number of modification factors to improve overall safety to account for various route, environmental, and brake system factors. For example, one modification factor may comprise the terrain over which the train will operate as expressed in track database 16 and determined by the location of the train, which is typically determined by global positioning satellite (GPS) systems. If the terrain and track are generally flat and tangent, then initial safe brake threshold is adjusted by multiplying by a safety factor of 1.0. If the terrain and track include long descending gradients and/or challenging curvature, the initial safe brake threshold may be multiplied by a predetermined safety factor that is higher than 1.0, such as 1.06, which would increase the initial safe brake threshold from the 85 percent minimum to 90 percent. Additional safety factors could be assigned to certain terrain, specific locations such as cities, regions with large numbers of unrestricted grade crossings, or for trains carrying hazardous materials such as crude oil or ethanol. The safe brake threshold may be modified according to single or multiple such factors so that a general freight train operating cross-country on a flat tangent track will have a less restrictive modified safe brake threshold than the modified safe brake threshold of a crude oil train operating in mountainous territory.

The safe brake threshold may further be modified by a seasonal factor to account to environmental conditions. Optimal weather conditions, such as those present in summer, may be assigned a multiple of 1.0 while wintry conditions assigned a multiple greater than 1.0.

The safe brake threshold may also be modified by an equipment factor that reflects the type of braking system safety features that are included in the braking system of the train. For example, a train that has wagons equipped with brake cylinder maintaining (BCM) could be assigned a safety factor of 1.0 while trains without such a feature would have a safety factor greater than 1.0.

The safe brake threshold may be further modified by a brake pipe (BP) leakage factor to account for BP leakage as determined from brake pipe pressure flow and gradient measurements available to system 10. For example, a train with more than a predetermined minimum amount of brake pipe flow in a "brakes released and fully recharged" state is likely experiencing an unacceptable amount of brake pipe and reservoir leakage and a train with more than a predetermined minimum amount of brake pipe flow in a "brakes applied" state is likely experiencing an unacceptable amount of brake pipe and brake cylinder leakage. The flow in the "brakes applied" state is a measurement of the brake pipe and brake cylinder leakage as, in this state, the brake cylinder pressure is maintained to either the setting of the quick service limiting valve (QSLV), typically 10-12 psi for control valves that do not have BCM functionality or to the brake cylinder command pressure by control valves with BCM functionality. In either case, the replenishment air is provided by the brake pipe so that the amount of brake pipe flow allows for a calculation of the amount of leakage. For example, the train brake leakage can be estimated by calculating the brake pipe leakage flow at the recharge pressure, making a brake application, calculating the equivalent brake pipe leakage at the new lower brake pressure (head pressure is reduced, so leakage flow is reduced even though the leak size remains the same), measuring the actual brake pipe flow with the brakes set, and then subtracting the equivalent brake pipe leakage from the actual brake pipe flow with the brakes set. The net resulting brake pipe flow can be inferred to be the result of brake cylinder leakage. In this calculation, the leakage contribution in the release and recharge state by the reservoirs is ignored, as it is typically small compared to the brake pipe leakage. Correspondingly, if the brake pipe pressure gradient, i.e., the difference in brake pipe pressure between the head end of the train and the last car of the train, is also above a predetermined threshold, the braking system of the train is experiencing an unacceptable level of leakage and the cars at the end of the train do not have an acceptable amount of pressure to operate properly. As a result, a BP leakage factor of 1.0 may be assigned for a brake pipe flow is less than a minimum of 15 CFM with a gradient of less than 5 psi. If the flow is greater than 15 CFM and the gradient is greater than 5 psi, however, then the BP leakage factor may be assigned a value greater than 1.0. The BP leakage factor may be determined so that it proportionally increases with the ratio of flow in CFM divided by a predetermined threshold CFM (60 CFM under the FRA class 1/1 A terminal test) and/or the gradient in psi divided by a predetermined threshold psi (such as 15 psi).

Thus, the default or regulatory initial safe brake threshold (SBT) could be modified according to the following formula:

$$\text{Modified } SBT = \text{Initial } SBT * \text{terrain safety factor} * \text{city factor} * \text{cargo factor} * \text{seasonal factor} * \text{equipment factor} * BP \text{ leakage factor.}$$

It should be recognized that any additional factors impacting on the performance of the braking system may be assigned a corresponding adjustment factor to more accurately reflect the impact of those factors on the braking efficiency of the train. However, if the modified safe brake threshold is calculated to be greater than the maximum braking effort of the train, the safe brake threshold can be set to a predetermined maximum value that is slightly less than 100 percent, such as 95 percent.

System 10 further comprises an actual brake efficiency module 28 that compares the expected brake power that was determined by expected brake power module 22 against the actual brake power of the train as determined by actual brake power module 24 during the operation of the train. Actual brake efficiency module 28 may then compare the difference between the expected brake power and the actual brake power to determine whether the braking efficiency of train is above the safe brake threshold of safe brake threshold module 26. Actual brake efficiency module 28 thus determines whether the actual brake power of the train has degraded to point where it has fallen below the current safe brake threshold. Alternatively, actual brake efficiency module 28 may calculate the net braking ratio of the train using the actual brake power determined by actual brake power module 24 and the net braking ratio formula solved for the net braking ratio as follows:

$$NBR_{train} = \text{Brake Force}/(W_{train}*\mu)*(65-3.5)(BP \text{ Reduction}*2.5)$$

$NBR_{train}$ may then be compared against the appropriate net braking ratio requirements to determine whether braking efficiency has degraded below a safe brake threshold that is based on net braking ratio, such between 8.5 and 38 percent depending on whether the cars are full or empty, respectively.

System 10 may further includes a response module 30 that is programmed to provide information about the actual brake efficiency of the train or to take certain action(s) depending whether the train is operating in a manner that fails to meet the safe brake threshold set by safe brake threshold module 26. For example, response module 30 can interact with a display module 32 to provide a real-time output of the actual brake power to the train operator using the conventional operator display associated with train control system 12 so that the operator is alerted when the safe brake threshold is not being met. Response module 30 can also be programmed to interact with a report module 34 that generates a report or recording of events related to the actual brake power and its relationship to expected brake power. To further improve safety, system 10 may also take affirmative action in response to a determination that the train has fallen below the safe brake threshold. Response module 30 may be associated with a shut down module 36 that slows down or even stops the train when the actual brake power has dropped below the safe brake threshold as may be required by some governmental regulations. Response module 30 may further be programmed to cooperate with a brake adjustment module 38 to adjust the actual braking power of the train, such as by changing the brake pipe pressure of the braking system to increase the brake power of the train such that the actual brake power of the train exceeds the applicable safe brake threshold.

In addition to inferring the status of the brakes on the train by comparing actual brake power to expected brake power, system 10 can optionally receive hot/cold wheel data from wayside detectors 40. Wayside detectors 40 are stationary non-contacting thermal measurement systems that measure the wheel temperatures on each car of the train as it passes the wayside detector. Wayside detectors are generally located at the bottom of a grade and measure the relative brake effectiveness on each car by the wheel temperatures on that car compared to wheel temperatures on the other cars in that same train. Wheels with temperatures which are outside statistical norms are flagged and the corresponding car number is determined from an RFID tag on that car. A car with an overly hot wheel may have a stuck brake or a hand brake in the "on" position, while a car with an overly cold wheel may have a failed brake. Wheel temperature data may be transmitted wirelessly to system 10 or routed from wayside detector 40 to a central server and then to system 10. The resulting measurement of wheel temperatures provides direct feedback of the brake status on each car and may be correlated to the measured train brake power. While indication of a cold wheel might not result in a fault action by response module 30 if the actual brake power satisfies the safe brake threshold, the train may nevertheless be stopped so that the crew can service or disengage the faulty brake. Alternatively, wheel temperatures could be provided to system 10 via onboard sensors.

Figure 2:
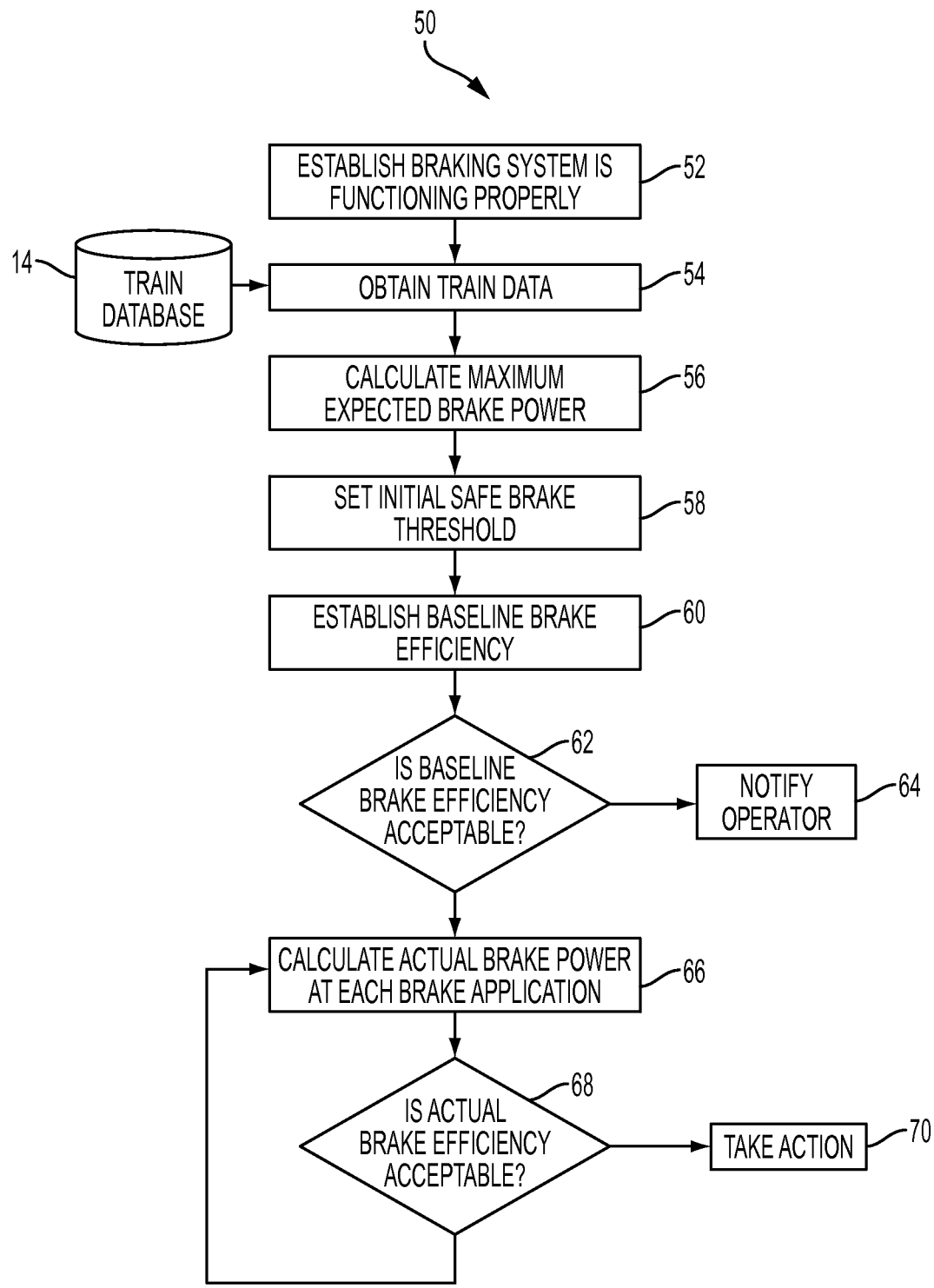
FIG. 2 is a flowchart of the operation of a train brake safety monitoring and fault action system according to the present invention.

Referring to FIG. 2, system 10 may implement a train brake safety monitoring process 50. The first step 52 in process 50 is to establish that the braking system is functioning properly, such by performing the terminal test required by FRA. A train that passes the initial test is presumed to have one hundred percent functional brakes and thus can provide a baseline expected brake power for system 10. The next step 54 is to obtain the specific train data information from train database 14, including the number of locomotives and number of cars in the train. Once the train data has been provided, system 10 can calculate the maximum expected brake power 56 that is theoretically possible with 100 percent operable brakes. A safe brake threshold may then be set 58, such as 85 percent (or a greater percentage as may be desired or required) of the calculated maximum expected brake power 56.

After an initial train brake application, and preferably as soon as train begins its route or to leave the terminal, system 10 may correlate the actual train brake power to the expected train brake power to establish a baseline actual brake efficiency 60. This step could be repeated for a predefined number of brake applications, for example three sequential brake applications, and then averaged to more accurately establish baseline actual brake efficiency 60. If a comparison against the safe brake threshold 62 at this point reveals that the baseline actual brake efficiency 60 fails to satisfy safe brake threshold 58, the braking system is not operating as required and system 10 can notify the operator 64 that an inspection is required or provide railroad operations with a status report using radio or other conventional telemetry advising that the train must be routed to a siding as the braking system is not working at 100 percent efficiency.

If the initial actual braking power efficiency is acceptable and the train departs the terminal, process 50 continues to monitor braking performance by calculating the actual brake power at each subsequent brake application 66. The ongoing actual brake power calculation 66 is thus determined in real-time during the course of operation of the train and may be continuously compared against the baseline brake efficiency 60 to determine whether the actual brake power satisfies the safe brake threshold 58. System 10 may optionally display the current actual brake efficiency to the train driver and update that value after each brake application. If the actual brake efficiency falls below the safe brake threshold, system 10 can take the appropriate action as explained above, such initiating a non-suppressible, full service penalty brake to bring the train to a full stop as required by the FRA if the train braking system is determined to be less than 85 percent.

If the actual current brake power is above the safe brake threshold, but diminishing, a warning or alert may be provided to the driver and a train brake status report can be sent to the railroad operations office. Additionally, system 10 may make a recommendation to the train driver to compensate for diminished brake power. For example, if the current actual brake power is determined to be 90 percent of the expected power or initial baseline, system 10 can recommend a brake application level that is higher than would otherwise be ordered by driver to compensate for the missing brake power, thereby improving braking performance.

If system 10 is configured to receive information from wayside hot/cold wheel detectors and the train passes a wayside hot/cold wheel detector that indicates one or more cold wheels, system 10 can adjust the percent operable brake to show the lesser of either that measured by means of the total current brake power, or that calculated based on the number of cars with cold wheels. Furthermore, the system may update the driver display to show the current actual brake power minus an appropriate reduction in brake power due to the number of cold wheels indicating that particular brakes are not functioning and thus not contributing to actual brake power.

If system 10 determines that the actual brake power has fallen below the safe brake threshold, system 10 can execute one or more actions to improve the safety of the train. For example, a speed reduction for the train may be implemented through display module 32. Conventional train control systems 12 are provided with track speed limits via track database 16 and then display the current speed limit to the driver based on a GPS determination of the actual location of the train along the track in track database 16. Track signal spacings are defined by the limiting speed limit and an assumption that the train has at least 85 percent operable brakes. The total kinetic energy of the train is proportional to ½ MV² and that kinetic energy is converted to thermal energy during braking. When less than 100 percent of the brakes are operable, the remaining brakes must therefore brake the mass of the un-braked cars and dissipate the energy of the un-braked cars. As a result, the operating speed of the train may be reduced to increase train safety by setting the speed reduction to the speed at which the train will still be able to stop within the set signal spacing even with less than 100 percent operable brakes. In addition, the speed reduction will reduce the wheel temperatures of the remaining operable brakes and help avoid problems associated with over temperature wheels.

Figure 3:
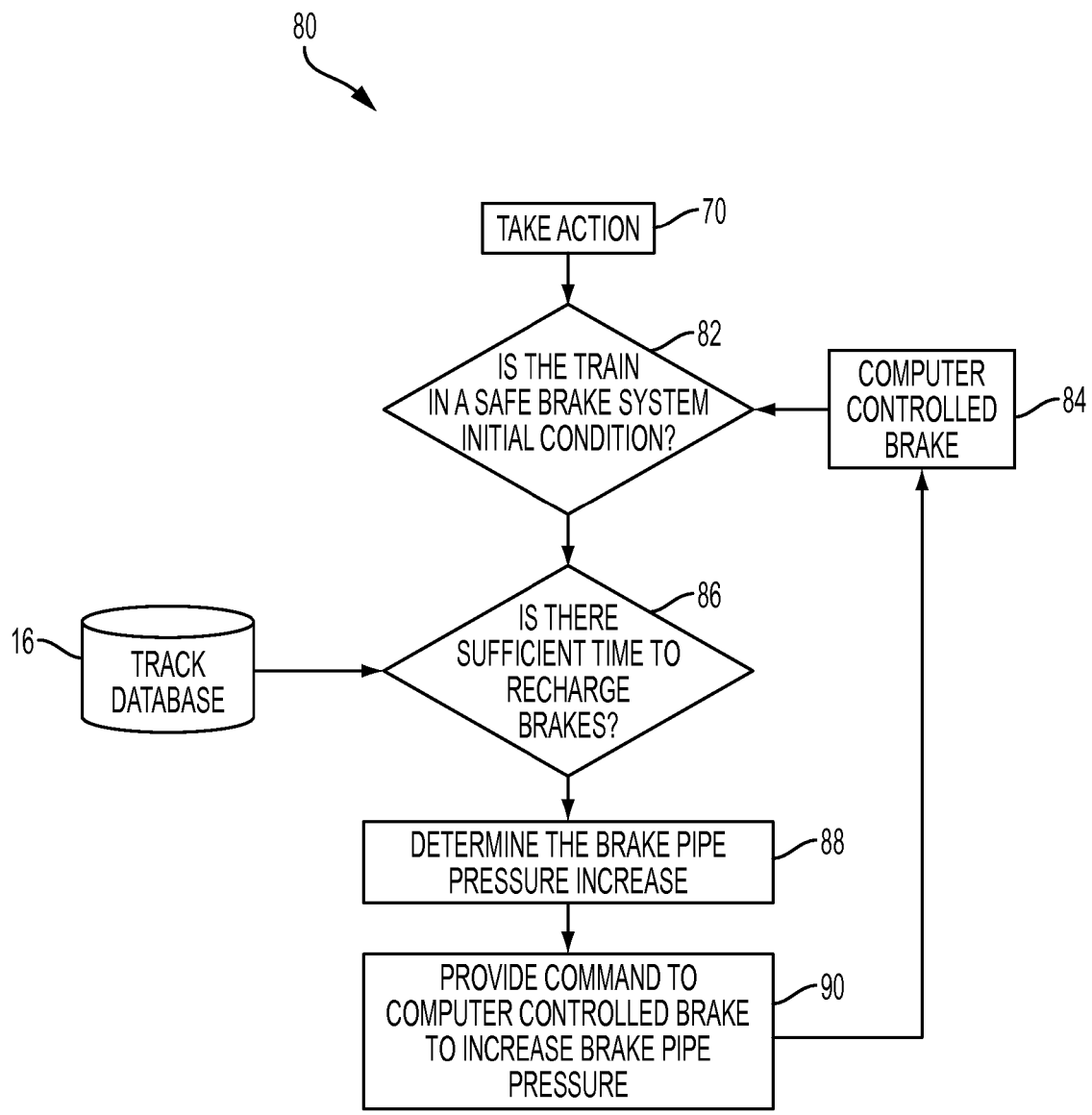
FIG. 3 is a flowchart of a brake pipe set pressure adjustment process for a train brake safety monitoring and fault action system according to the present invention.

Referring to FIG. 3, another response that may be directed by system 10 is to dynamically increase the brake pipe set pressure of the braking system according to a brake pipe set pressure adjustment process 80. As actual train brake power will increase in response to an increase in the brake pipe set pressure, actual brake power may be increased relative to the baseline brake power. If system 10 determines the need to take action 70, as described above, a check 82 is performed to determine whether the train is in a safe brake system initial condition. A safe brake system initial condition may comprise the brakes being in the applied condition or in a fully released and recharged condition. The brake system condition may be determined from brake state feedback provided from computer controlled brake (CCB) system of the lead locomotive, the measured head-end brake pipe pressure, the brake pipe flow on the lead locomotive, the brake pipe pressure on the last car as measured by an End-of-Train (EOT) device, and the brake pipe gradient on the train. A check 86 must also be performed of the track profile in track database 16 and the current location of the train, typically determined by GPS, to determine that there is sufficient time to recharge the brakes to a higher level before another brake application will be needed along the route. Once a safe brake system initial condition has occurred and there is time to recharge, system 10 may determine the appropriate brake pipe pressure increase that is appropriate to compensate for the calculated loss in brake power 88. The amount of increase may be established by default and simply retrieved from memory or an internal setting. Alternatively, the amount of increase may be calculated to compensate for the particular loss of brake power. For example, system 10 may increase the brake pipe pressure proportionally to compensate for loss of actual brake power, up to a maximum pressure of 110 psi, by using the following formula to determine the appropriate increase in brake pipe (BP) pressure:

(1−actual brake efficiency)=(New *BP* Set Pressure−Current *BP* Set Pressure)/(Current *BP* Set pressure)

or

New *BP* Set Pressure=(Current *BP* Set Pressure)*(1+(1−actual brake efficiency))

For example, if the current brake pipe set pressure is 90 psi and the current actual brake efficiency is 85 percent, then the new brake pipe set pressure is 103.5 psi.

Once the brake pipe pressure increase is determined 88, a command 90 may be sent to the CCB 84 to increase the brake pipe set pressure. Alternatively, the appropriate change could be displayed for the operator to make the adjustment manually. The next time the brakes are applied and released, the brake pipe will recharge to the new higher level. If the brakes are currently in the fully released and recharged state, the brake pipe pressure may be increased and the train brakes recharge to that new level. To prevent the possibility of stuck brakes, system 10 can inhibit the reduction of the brake pipe set point until after an emergency brake application.

System 10 may optionally improve the measurement of brake cylinder leakage for brake applications of long duration by monitoring the increase of brake pipe flow with time. On trains with cars not equipped with BCM functionality, the QSLV only maintains the brake pressure to the QSLV setting of about 8 to 12 psi. As a result, brake leakage resulting in increased brake pipe flow may only be detected after the brakes have been applied for a sufficient length of time so that the brake cylinder has time to leak down to the QSLV setting. For example, a 10 psi brake pipe reduction would nominally result in a 25 psi brake cylinder pressure. At a leakage rate of 1 psi/min, it would take 15 minutes before the brake cylinders leaked down to a 10 psi nominal QSLV value such that the QSLV started compensating for the leakage. System 10 may be programmed to calculate, store, and display to the driver a measurement of the average brake cylinder leakage determined as discussed above. System 10 may further display both the current leakage as well as the highest amount of leakage experienced during a trip. The highest amount of leakage stored in memory may be updated to a greater or lesser value whenever the normalized measurement conditions are the same as or longer than the conditions which resulted in the stored value when those conditions include the initial brake cylinder pressure and the duration of the brake set. For example, a 15 psi brake pipe application should result in a brake cylinder pressure of approximately 37 psi, which will leak to a 10 psi QSLV in 27 minutes if the brake cylinder is leaking at a rate of a 1 psi/min rate, while a 10 psi brake application will result in a 25 psi brake cylinder pressure that will leak to a 10 psi QSLV in 15 minute at the same leakage rate. As the relationship between brake pipe reduction and brake cylinder pressure is known and is approximately 1.0 to 2.5, the time to reach the QSLV setting is dependent on the starting brake cylinder pressure and the leak rate.

What is claimed is:

1. A train brake safety system, comprising:
   a first module programmed to calculate the actual brake power exhibited by a train during operation of the train;
   a second module programmed to determine whether the actual brake power exhibited by the train has fallen below a safe brake power threshold;
   a third module programmed to take action in response to the actual brake power falling below the safe brake power threshold, wherein the action comprises the sending of a command to a brake control system having a brake pipe set pressure to cause an increase in the brake pipe set pressure by a predetermined amount in response to the actual brake power falling below the safe brake power threshold.

2. The system of claim 1, wherein the third module is programmed to stop the train in response to the actual brake power falling below the safe brake power threshold.

3. The system of claim 1, wherein the third module is programmed to calculate the predetermined amount of increase in the brake pipe set pressure based upon the difference between the actual brake power of the train and the safe brake power threshold.

4. The system of claim 1, wherein the safe brake threshold comprises a percentage of an expected brake power for the train.

5. The system of claim 4, wherein the safe brake threshold is adjusted according to at least adjustment factor.

6. The system of claim 5, wherein the adjustment factor is at least one factor selected from the group consisting of the particular terrain of the route to be traversed by the train, the geographic nature of the route to be traversed, the type of cargo carried by the train, the weather conditions, and the operation of the braking system of the train.

7. The system of claim 5, wherein the expected brake power for the train is determined based upon an actual amount of brake power applied by the train during a test.

8. The system of claim 4, wherein the expected brake power for the train is determined based upon a calculation of a theoretical amount of brake power that can be applied by the train.

9. A method of providing train brake safety, comprising the steps of:
   determining the expected brake power of a train;
   comparing the actual brake power of a train during operation of the train to the expected brake power of a train; and
   initiating a response indicating an unsafe amount of available brake power if the actual power of the train is less than the expected brake power of the train by a safe brake threshold, wherein the response comprises sending a command to a brake control system having a brake pipe set pressure to cause an increase in the brake pipe set pressure by a predetermined amount in response to the actual brake power falling below the safe brake power threshold.

10. The method of claim 9, wherein the predetermined amount of increase in the brake pipe set pressure is calculated based upon the difference between the actual brake power of the train and the safe brake power threshold.

11. The method of claim 9, wherein the safe brake threshold comprises a percentage of the expected brake power for the train that is adjusted according to at least adjustment factor.

12. The method of claim 11, wherein the adjustment factor is at least one factor selected from the group consisting of the particular terrain of the route to be traversed by the train, the geographic nature of the route to be traversed, the type of cargo carried by the train, the weather conditions, and the operation of the braking system of the train.

13. The method of claim 9, wherein the expected brake power for the train is determined based upon a calculation of a theoretical amount of brake power that can be applied by the train.

14. The method of claim 9, wherein the expected brake power for the train is determined based upon an actual amount of brake power applied by the train during a test.

* * * * *